US006934134B2

(12) United States Patent
Mori et al.

(10) Patent No.: US 6,934,134 B2
(45) Date of Patent: Aug. 23, 2005

(54) DIRECT CURRENT LOAD BREAKING CONTACT POINT CONSTITUTION AND SWITCHING MECHANISM THEREWITH

(75) Inventors: Tetsuya Mori, Shiga (JP); Kenji Funaki, Ritto (JP); Yasusuke Takahashi, Kumamoto (JP); Kozo Maenishi, Nagaokakyo (JP)

(73) Assignee: OMRON Corporation, Kyoto (JP)

( * ) Notice: Subject to any disclaimer, the term of this patent is extended or adjusted under 35 U.S.C. 154(b) by 301 days.

(21) Appl. No.: 10/378,363

(22) Filed: Mar. 3, 2003

(65) Prior Publication Data

US 2003/0184928 A1 Oct. 2, 2003

(30) Foreign Application Priority Data

Mar. 11, 2002 (JP) ........................................ 2002-065172

(51) Int. Cl.[7] .................................................. H02H 3/00
(52) U.S. Cl. ........................................... 361/2; 361/115
(58) Field of Search ................................ 200/262, 266, 200/263; 361/2, 58, 6, 115

(56) References Cited

U.S. PATENT DOCUMENTS 4,204,863 A * 5/1980 Schreiner ..................... 75/234
4,855,104 A * 8/1989 Rothkegel et al. ............ 419/28
5,798,468 A * 8/1998 Weise et al. .................. 75/232

FOREIGN PATENT DOCUMENTS

| | | | | |
|---|---|---|---|---|
| EP | 0 318 892 A1 | 6/1989 | ............ | H01H/1/02 |
| FR | 2 307 358 | 11/1976 | ............ | H01H/1/02 |

OTHER PUBLICATIONS

European Search Report dated Jun. 11, 2003, 4 pages.

* cited by examiner

*Primary Examiner*—Stephen W. Jackson
(74) *Attorney, Agent, or Firm*—Osha Liang LLP

(57) ABSTRACT

The invention intends to provide a direct current load breaking contact point constitution that can make and break an electrical circuit under both direct current loads of direct current resistance load and direct current inductance load over a long period of time without causing problems such as ① the conduction defect due to the consumption of the contact point, ② the locking due to material transfer from one contact point to the other contact point, ③ the welding between the contact points, and ④ the abnormal arc continuation, and a direct current load breaking switching mechanism such as a relay, a switch and so on that has the contact point constitution. The direct current load breaking contact point constitution according to the invention comprises a movable contact point and a stationary contact point that face each other; wherein the movable contact point is made of $AgSnO_2In_2O_3$ alloy that contains at least Ag, 8 to 15% by weight in total of metal oxides including $SnO_2$ and $In_2O_3$, 6 to 10% by weight of $SnO_2$ and 1 to 5% by weight of $In_2O_3$; the stationary contact point is made of AgZnO alloy that contains at least Ag and 7 to 11% by weight of ZnO; and polarity of a movable side is (+) and that of a stationary side is (−).

4 Claims, 1 Drawing Sheet

DIRECT CURRENT LOAD BREAKING CONTACT POINT CONSTITUTION AND SWITCHING MECHANISM THEREWITH

BACKGROUND OF THE INVENTION

1. Field of the Invention

The invention relates to a contact point constitution that makes and breaks a direct current load and a switching mechanism such as a relay and a switching mechanism having the contact point constitution.

2. Description of the Related Art

As a contact point material for a relay or a switching mechanism that makes and breaks an electric circuit, from viewpoint of performance and price, AgCdO alloy has been generally used. When the material is used in movable contacts and stationary contacts, under either direct current loads of direct current resistance load and direct current induction load, problems such as the conduction defect due to consumption of the contact point, locking due to material transfer from one contact point to other contact point, welding between contact points, and abnormal arc continuation have not been experienced over a long period of time. However, since the AgCdO contact point contains a hazardous material, Cd, in recent years, a movement against the use of the relays and switches that use cadmium is gathering strength. In such movement, development of switching mechanisms that use contact point materials capable of substituting the AgCdO contact points is urgent.

Technology that uses, as the contact point material that does not contain cadmium (hereinafter referred to as "cadmium-free contact point materials"), silver-tin oxide-indium oxide system contact points (hereinafter referred to as "$AgSnO_2In_2O_3$ system contact point"), silver-tin oxide system contact points (hereinafter referred to as "$AgSnO_2$ system contact point"), silver-nickel system contact points (hereinafter referred to as "AgNi system contact point"), silver-zinc oxide system contact points (hereinafter referred to as "AgZnO system contact point") and soon has been developed. In such technology, the above contact point materials each can be independently used as a contact point material common to both of the movable contact point and stationary contact point. However, since, in such technology, there are strong and weak load regions of load-breaking switching mechanisms, the above contact point materials cannot necessarily substitute for the AgCdO contact points in both direct current loads of direct current resistance load and direct current induction load. For details, when the above contact point materials each are independently used as the contact point material common to the movable contact point and stationary contact point, under the direct current induction load, problems such as ① conduction defect due to consumption of the contact point, ② locking due to material transfer from one contact point to other contact point, ③ welding between the contact points, and ④ abnormal arc continuation are caused. Furthermore, under the direct current resistance load, the problems such as above ② through ④ are caused. Thus, it is very difficult to replace, by independently using the above cadmium-free contact point materials each as the common contact point material, the AgCdO contact point under both load conditions.

In particular, among the above-mentioned cadmium-free contact point materials, the AgZnO system contact points, though used only in some cases in breakers and so on that are relatively small in the number of makings and breakings, from the following reasons, are seldom used in the switching mechanisms such as relays that are frequently made and broken.

(1) Since the AgZnO system contact point is low in the consumption-resistance, there is danger of insulation deterioration.

(2) Since the AgZnO system contact point is low in the consumption-resistance, the number of lifetime is short.

(3) Since the AgZnO system contact point is very high in the hardness, it is difficult to process into a small contact point.

The $AgSnO_2InO_3$ contact point is much in the transfer of the contact point when the direct current induction load is made and broken and frequently causes a problem in that the abnormal arc continuation results. Accordingly, the $AgSnO_2InO_3$ contact point can be applied to the direct current induction load with difficulty.

In order to enable the cadmium-free contact point material to substitute for the AgCdO contact point in both direct current load conditions of the direct current resistance load and the direct current induction load, a structure of the switching mechanism is tried to largely revise. However, there is a problem in that the large revising takes a very long period of time and needs much expense.

Furthermore, although different cadmium-free materials are tried to use separately as the movable contact point material and the stationary contact point material, it is also difficult to always replace the AgCdO contact point in both of the direct current resistance load and the direct current induction load. That is, under the both of the above loads, the problems from ① to ④ are not always overcome.

Accordingly, it is considered to prepare in advance a switching mechanism that can inhibit the above problems from occurring only under the direct current resistance load that has no inductivity and a switching mechanism that can inhibit the above problems from occurring only under the direct current induction load that has inductivity and to use these according to the inductivity of the loads. However, the selection of the contact point material has to be decided depending not on the inductivity of the load thereto the switching mechanism is applied but on a magnitude of the inductivity of the load (in general, time constant and magnitude of inductance). That is, in the direct current inductance load, the magnitude of the inductivity of the load is various depending on the kind of the load. Accordingly, when the switching mechanism that does not cause the above problems under the direct current induction load that has particular inductivity, because of being suitable to the direct current induction load, is applied to the direct current inductance load that has the inductivity different from the above inductivity, the problems cannot be necessarily inhibited from occurring. Accordingly, actually the selection of the contact point material has to be carried out while confirming the magnitude of the inductivity of the load to be applied, that is, it is remarkably troublesome.

The invention is carried out in view of the above circumstances and intends to provide a direct current load breaking contact point constitution that can make and break an electric circuit over a long period of time under both direct current loads of the direct current inductance load and the direct current resistance load without causing problems such as ① the conduction defect due to the consumption of the contact point, ② the locking due to the material transfer from one contact point to other contact point, ③ welding between the contact points, and ④ the abnormal arc continuation; and a switching mechanism having the above constitution.

In the specification, ① "the conduction defect due to the consumption of the contact point" means a phenomenon in which because of the consumption of the contact point, a movable contact point and a stationary contact point do not come into contact or a phenomenon in which although the movable contact point and the stationary contact point are in contact but are not in conduction. It is considered that when the contact points are separated under the direct current induction load, since a relatively large energy stored in the load (arc discharge energy) is discharged at once, the contact point material causes not only the transfer described later in ② but also the sticking to the surroundings of the contact point, resulting in consuming one contact point (negative electrode side) and causing the conduction defect. In the direct current resistance load, such energetic arc discharge as in the direct current induction load is not caused that such conduction defect is not caused.

② "The locking due to the material transfer from one contact point (negative electrode side) to the other contact point (positive electrode side)" means a phenomenon in which concavities and convexities that are generated owing to the transfer of the contact point material between surfaces of different contact points lock each other and the movable contact point and the stationary contact cannot be separated or are delayed in the separation. Such phenomenon can be caused in both of the direct current induction load and resistance load. However, in the direct current inductance load, the material transfer is caused substantially only in one direction from the negative electrode side to the positive electrode side, and in the direct current resistance load, the transfer can be caused in both directions of from the negative electrode side to the positive electrode side and vice versa.

③ "The welding between the contact points" means a phenomenon in which because of the melting of a surface of the contact point, the movable contact point and the stationary contact point stick each other and cannot be separated or are delayed in the separation. The phenomenon can be caused in both direct current loads of the direct current resistance load and the direct current induction load.

④ "The abnormal arc continuation" means a phenomenon in which despite of complete separation of the movable contact point and the stationary contact point, the arc discharge continues for a relatively long period of time (for instance, several hundreds milliseconds or more) between the movable contact point and the stationary contact point. The phenomenon can be caused in both direct current loads of the direct current resistance load and the direct current induction load.

SUMMARY OF THE INVENTION

The invention relates to a direct current load breaking contact point constitution and a direct current load breaking switching mechanism such as a relay and a switch having the constitution. The direct current load breaking contact point constitution comprises a movable contact point and a stationary contact point that face each other, the movable contact point being formed of $AgSnO_2In_2O_3$ alloy that contains at least Ag, 8 to 15% by weight in total of metal oxides including $SnO_2$ and $In_2O_3$, 6 to 10% by weight of $SnO_2$, and 1 to 5% by weight of $In_2O_3$, the stationary contact point being formed of AgZnO alloy that contains at least Ag and 7 to 11% by weight of ZnO, polarity of a movable side being (+), and polarity of a stationary side being (−).

In the specification, in the composition expression of the contact point materials, "Ag-xM" means that it is an alloy made of Ag and M and contains x % by weight of M with respect to a total weight. For instance, "Ag-8ZnO" means that it is an alloy made of Ag and ZnO and contains 8% by weight of ZnO with respect to a total weight. Furthermore, for instance, "Ag-$8SnO_2$-$3In_2O_3$" means that it is an alloy made of Ag, $SnO_2$ and $In_2O_3$ and contains 8% by weight of $SnO_2$ with respect to a total weight and 3% by weight of $In_2O_3$ with respect to a total weight.

DETAILED DESCRIPTION OF THE INVENTION

Figure 1:
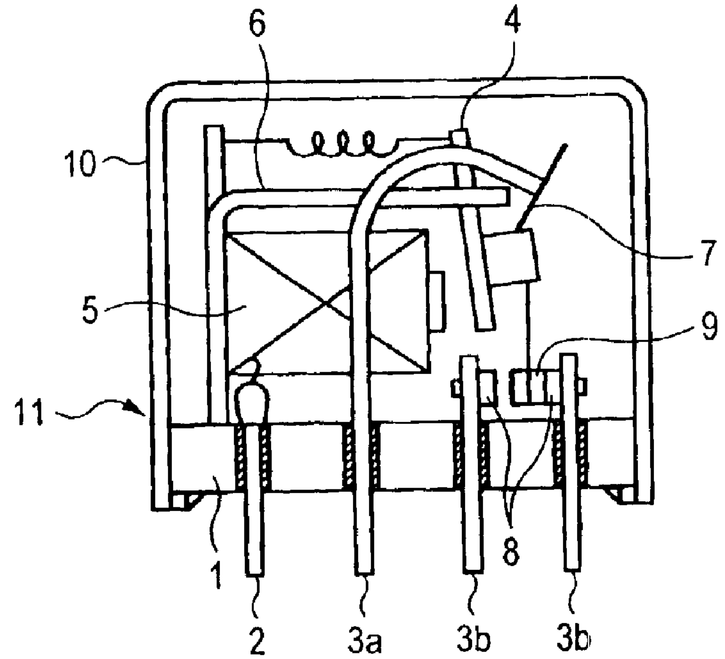
FIG. 1 is a schematic longitudinal sectional view showing an entire constitution of an electromagnetic relay as a switching mechanism having a contact point constitution according to the invention.

A direct current load breaking contact point constitution according to the invention has a switching function that can make and break the direct current load in an electric circuit and constitutes part of a direct current load breaking switching mechanism such as a relay, a switch and so on. Such direct current load breaking contact point constitution according to the invention has a movable contact point and a stationary contact point that face each other, the movable contact point being formed of $AgSnO_2In_2O_3$ alloy, and the stationary contact point being formed of AgZnO alloy. When the movable contact point is made of AgZnO alloy and the stationary contact point is made of $AgSnO_2In_2O_3$ alloy, under at least one of the direct current resistance load and the direct current inductance load, such problems as the conduction defect due to consumption of the contact point, the locking due to the material transfer from one contact point to other contact point, the welding between the contact points, and the abnormal arc continuation are caused at a relatively earlier stage.

The $AgSnO_2In_2O_3$ alloy that constitutes the movable contact point is an alloy containing at least Ag, $SnO_2$ and $In_2O_3$, and, as far as the above intention can be achieved, can slightly contain other elements (metals or metal oxides).

A total content of metal oxides (for instance, $SnO_2$, $In_2O_3$) contained in the $AgSnO_2In_2O_3$ alloy is 8 to 15% by weight, being preferable to be 10 to 12% by weight. When $SnO_2$ and $In_2O_3$ are added to the Ag contact point, the arc-extinguishing capacity at the time of contact point separation can be improved, and the larger the additional amount thereof is, the more larger the effect becomes. For instance, whereas, when the contact point material is made of Ag alone, an arc continuation period at the time of contact point separation is 15.8 ms, it is 13.5 ms when the Ag-$8SnO_2$-$3In_2O_3$ contact point is used. Accordingly, when a total content of such metal oxides is too small, since the arc continuation period at the contact point separation becomes longer, a large transfer amount results, resulting in easily causing the abnormal arc continuation. On the other hand, when the total content of the metal oxides is too large, the processing into a contact point shape becomes difficult. In addition, since the contact resistance of the contact point is increased, it cannot stand up to the use as the switching mechanism.

The content of $SnO_2$ is 6 to 10% by weight relative to a total weight of the $AgSnO_2In_2O_3$ alloy, being preferable to be 7 to 9% by weight. $SnO_2$ is cheaper in the price, larger in the hardness and larger in an improvement effect in the welding resistance properties than $In_2O_3$. Accordingly, when the content of $SnO_2$ is too small, the content of $In_2O_3$ has to be increased to satisfy the total content of the metal oxides, resulting in a rise of manufacturing cost. On the other hand, when the content of $SnO_2$ is too large, the content of $In_2O_3$ has to be reduced to satisfy the total content of the metal oxides, resulting in larger hardness of the alloy and in difficulty in processing into a contact point shape.

The content of $In_2O_3$ is 1 to 5% by weight relative to a total weight of the $AgSnO_2In_2O_3$ alloy, being preferable to be 2 to 4% by weight. When the content of $In_2O_3$ is too small, the alloy can be processed into a contact point shape with difficulty. On the other hand, when the content thereof is too large, there is a problem in that the manufacturing cost is pushed up.

The AgZnO alloy constituting the stationary contact point is an alloy containing at least Ag and ZnO, and, as far as the intention can be attained, other elements (metals or metal oxides) can be slightly contained.

The content of ZnO is 7 to 11% by weight relative to the total weight of the AgZnO alloy, being preferable to be 8 to 10% by weight. In the direct current induction load, when ZnO is added to the Ag contact point, the arc-extinguishing capacity at the contact point separation can be improved, and the larger the additional amount thereof is, the larger the effect is. For instance, whereas when the contact point material is made of Ag alone the arc continuation period at the contact point separation is 15.8 ms, 12.8 ms for Ag-8ZnO, and 12.4 ms for Ag-10ZnO. This is considered that because ZnO can be vaporized more easily than Ag, a lot of arc energy is consumed. It is considered that an evidential material appears in the fact that ZnO is higher than Ag in the vapor pressure (ZnO: 400 Pa at 1673 degree Kelvin, Ag: 133 Pa at 1630 degree Kelvin). However, when the content of ZnO is too small, this effect cannot be sufficiently obtained, the arc continuation period under the direct current induction load becomes relatively longer, resulting in a larger transfer. Thereafter, the abnormal arc continuation is caused. On the other hand, when the content of ZnO is too large, the AgZnO alloy can be poorly processed and is difficult to manufacture.

The $AgSnO_2In_2O_3$ alloy and the AgZnO alloy, as far as containing the predetermined amounts of the respective components, can be manufactured according to any of known methods, for instance, can be manufactured according to powder metallurgical method or to an internal oxidation method.

The invention relates to a switching mechanism. The switching mechanism according to the invention is used with direct current load, and, as far as having a direct current load breaking contact point constitution as mentioned above, can have any of constitutions, for instance, may be relays, switches and so on.

One embodiment when the switching mechanism according to the invention is, for instance, a relay will be explained with reference to FIG. 1. FIG. 1 is a schematic longitudinal sectional view showing an entire constitution of an electromagnetic relay as a switching mechanism according to the invention. In FIG. 1, reference numeral 1 denotes a base portion, and a coil terminal 2, a common terminal 3*a* and a stationary contactor 3*b* are inserted therethrough and fixed thereto. Reference numeral 4 denotes an armature that is attached to a tip end portion of a stationary arm 6 so as to be freely rocked and can be driven through an electromagnet so as to rock, and a movable contactor 7 made of a spring material is held by the armature 4. Reference numeral 8 denotes a stationary contact point that is fixed to a tip end portion of the stationary contactor 3*b*, and a movable contact point 9 that can be freely separated from and joined to the stationary contact point 8 faces the stationary contact point 8 and is attached to a tip end portion of the movable contactor 7. Reference numeral 10 denotes a case that is engaged with the base portion 1 so as to encapsulate the respective constituent members.

Figure 2:
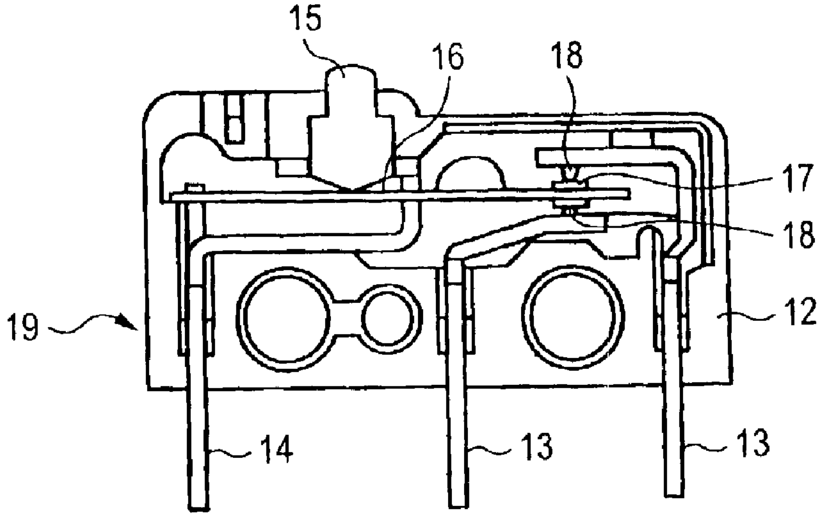
FIG. 2 is a schematic longitudinal sectional view showing an entire constitution of switch as a switching mechanism having a contact point constitution according to the invention.

Furthermore, one embodiment when the switching mechanism according to the invention is, for instance, a switch will be explained with reference to FIG. 2. FIG. 2 is a schematic longitudinal sectional view showing an entire constitution of the switch as the switching mechanism according to the invention. In FIG. 2, reference numeral 12 denotes a switch case made of an electrically insulating resin, stationary contactors 13 and a common terminal 14 are inserted therethrough and fixed thereto, and a switch operation button 15 is allowed to penetrate therethrough and held thereto so as to be freely slid. Reference numeral 16 denotes a movable contactor that responds to an operation of the switch operation button 15, and at a tip end thereof a movable contact point 17 is attached. Reference numeral 18 denotes a stationary contact point that can be freely separated from and joined to the movable contact point 17, and, while facing the movable contact point 17, is solidly attached to a tip end portion of the stationary contactor 13.

In the direct current load breaking contact point constitution and switching mechanism according to the invention, polarity of the movable contact point is set (+) to use and that of the stationary contact point is set (−) to use. "Polarity of the movable contact point being set (+) to use and that of the stationary contact point being set (−) to use" means that at the use under direct current load conditions, the contact point constitution and the switching mechanism are used by connecting so that the movable contact point may be connected to a positive electrode side of a direct current power source, and the stationary contact point may be connected to a negative electrode side thereof. For instance, when the relay according to the invention shown in FIG. 1 is used under the direct current induction load conditions, the relay may be used by connecting the common terminal 3*a* that is electrically connected to the movable contactor 7 having the movable contact point 9 to a positive electrode side of the direct current power source, and by connecting the stationary contactor 3*b* having the stationary contact point 8 to a negative electrode side of the direct current power source.

The direct current load breaking contact point constitution and switching mechanism according to the invention as mentioned above, when used under either of the direct current resistance load and the direct current induction load, can make and break an electrical circuit for a relatively long period of time without causing problems such as the conduction defect due to consumption of the contact point, the locking due to material transfer from one contact point to other contact point, the welding between the contact points, and the abnormal arc continuation. Furthermore, in the direct current load breaking contact point constitution and switching mechanism according to the invention, even when a separation force between the movable contact point and the stationary contact point is set at a relatively low value such as 0.03 to 0.7 N and a contact force is set at a low value such as 0.03 to 0.5 N, can make and break an electrical circuit over a long period of time without causing the above problems. The separation force is a driving force that is necessary to drive the movable contact point when the movable contact point is separated from the stationary contact point, and is one of initial settings that are determined in advance. The contact force is a force that is necessary to drive the movable contact point when the movable contact point and the stationary contact point are in contact, and is one of initial settings that are determined in advance.

The direct current load breaking contact point constitution and switching mechanism according to the invention can be applied to direct current electric circuits of all electric and electronic appliances from light current devices for use in homes to heavy current devices for use in factories, for instance, the contact point constitution and the switching mechanism can be effectively applied to make and break direct current electric circuits of a direct current value of 2 to 30 A, in particular 2 A or more and less than 20 A.

consumption of the contact point, the locking due to the material transfer from one contact point to the other contact point, the welding between the contact points and the abnormal arc continuation are regarded as "excellent". The evaluation is carried out of 5 pieces of relays under the respective conditions and the number of "excellent" relays is shown in the table. For instance, "1/5" means that one of five relays that are evaluated is excellent. In the invention, when "5/5" is attained under both conditions, ① and ②, the contact point material is regarded accepted.

① 30V, 10 A, resistance load, separation force 0.5 N/contact force 0.2 N

② 30V, 5 A, inductance load (tau=7 ms), separation force 0.5 N/contact force 0.2 N.

TABLE 1

| | Constitution material | | | Experimental load condition and result | |
|---|---|---|---|---|---|
| Experimental Example No. | Movable contact point | Stationary contact point | Polarity of movable side | ① DC 30 V, 10 A, resistance load | ② DC 30 V, 5 A, inductance load |
| 1 | Ag—12CdO | Ag—12CdO | (+) | 5/5 | 5/5 |
| 2 | Ag—12CdO | Ag—12CdO | (−) | 5/5 | 5/5 |
| 3 | Ag—8ZnO | Ag—8ZnO | (+) | 0/5 | 5/5 |
| 4 | Ag—8ZnO | Ag—8ZnO | (−) | 0/5 | 5/5 |
| 5 | Ag—10ZnO | Ag—10ZnO | (+) | 0/5 | 5/5 |
| 6 | Ag—10ZnO | Ag—10ZnO | (−) | 0/5 | 5/5 |
| 7 | Ag—12ZnO | Ag—12ZnO | (+) | 0/5 | 4/5 |
| 8 | Ag—12ZnO | Ag—12ZnO | (−) | 0/5 | 4/5 |
| 9 | Ag—8$SnO_2$—3$In_2O_3$ | Ag—8$SnO_2$—3$In_2O_3$ | (+) | 5/5 | 0/5 |
| 10 | Ag—8$SnO_2$—3$In_2O_3$ | Ag—8$SnO_2$—3$In_2O_3$ | (−) | 5/5 | 0/5 |
| 11 | Ag—10Ni | Ag—10Ni | (+) | 0/5 | 0/5 |
| 12 | Ag—10Ni | Ag—10Ni | (−) | 0/5 | 0/5 |
| *13 | Ag—8$SnO_2$—3$In_2O_3$ | Ag—8ZnO | (+) | 5/5 | 5/5 |
| 14 | Ag—8$SnO_2$—3$In_2O_3$ | Ag—8ZnO | (−) | 0/5 | 0/5 |
| *15 | Ag—8$SnO_2$—3$In_2O_3$ | Ag—10ZnO | (+) | 5/5 | 5/5 |
| 16 | Ag—8$SnO_2$—3$In_2O_3$ | Ag—10ZnO | (−) | 0/5 | 0/5 |
| 17 | Ag—8ZnO | Ag—8$SnO_2$—3$In_2O_3$ | (+) | 5/5 | 0/5 |
| 18 | Ag—8ZnO | Ag—8$SnO_2$—3$In_2O_3$ | (−) | 0/5 | 5/5 |
| 19 | Ag—10ZnO | Ag—8$SnO_2$—3$In_2O_3$ | (+) | 5/5 | 0/5 |
| 20 | Ag—10ZnO | Ag—8$SnO_2$—3$In_2O_3$ | (−) | 0/5 | 5/5 |
| 21 | Ag—10Ni | Ag—8ZnO | (+) | 0/5 | 5/5 |
| 22 | Ag—8$SnO_2$—3$In_2O_3$ | Ag—10Ni | (+) | 0/5 | 0/5 |

*Relays according to experimental examples 13 and 15 have the constitution according to the invention.

DESCRIPTION OF THE PREFERRED EMBODIMENTS (Embodiments 1 to 22)

Rivet contact points (movable contact point, stationary contact point) made of contact point materials described in the table are riveted to a movable contactor and a stationary contactor, respectively, and by assembling these components into a relay, a relay having the constitution shown in FIG. 1 is obtained. In the table, the contact point materials do not contain other metals and metal oxides than the metals and metal oxides described in the table.

The obtained relay is connected so that the polarity on the movable side may be the predetermined polarity, and is evaluated under the load conditions ① and ② later described. For details, 300,000 times of making and breaking are repeated of each of the relays, and for the direct current resistance load of ① ones that do not exhibit the locking due to the material transfer from one contact point to the other contact point, the welding between the contact points and the abnormal arc continuation are regarded as "excellent", and for the direct current induction load of ② ones that do not exhibit the conduction defect due to the From the above, it is confirmed from the experiments that relays according to Nos. 13 and 15 (the invention), irrespective of the inductivity of the load, can be always used under a wider range of the direct current load.

Relays other than that according to Nos. 13 and 15 cannot satisfy at least one of the direct current resistance load and the direct current inductance load.

For instance, relays (Nos. 14 and 16) similar to the relays according to the invention except for exchanging the polarities of the movable contact point and the stationary contact point, and relays (Nos. 18 and 20) in which a combination of the contact point materials and the polarities are similar to the invention but the combination of the movable contact point material and the stationary contact point material is exchanged cannot satisfy both of the direct current resistance load and the direct current induction load.

Furthermore, for instance, relays according to Nos. 21 and 22 that are similar to the relay according to No. 13 except for changing the movable contact point material or the stationary contact point material cannot clear of both of the direct current resistance load and the direct current induction load.

The direct current load breaking contact point constitution and switching mechanism (for instance, relays, switches and so on) according to the invention can exhibit the following effects.

(1) When the contact point constitution and the switching mechanism according to the invention are applied to any of the direct current resistance load and the direct current inductance load, problems such as the conduction defect, the welding of the contact points, the locking and the abnormal arc continuation are not caused for a long period of time. Accordingly, since there is no need of selecting the contact point material according to the magnitude of the inductivity of the load for each of the loads, the contact point materials can be standardized, resulting in providing the contact point constitution and the switching mechanism that can be always applicable to a wider range of the direct current load.

(2) Materials adversely affecting on the environment are not used. Accordingly, safety is high.

(3) There is no need of adding a particular structure and so on. Accordingly, the manufacturing cost is not pushed up.

What is claimed is:

1. A direct current load breaking contact point constitution, comprising:

a movable contact point and a stationary contact point that face each other;

wherein the movable contact point is made of $AgSnO_2In_2O_3$ alloy that contains at least Ag, 8 to 15% by weight in total of metal oxides including $SnO_2$ and $In_2O_3$, 6 to 10% by weight of $SnO_2$ and 1 to 5% by weight of $In_2O_3$; the stationary contact point is made of AgZnO alloy that contains at least Ag and 7 to 11% by weight of ZnO; and polarity of a movable side is (+) and that of a stationary side is (−).

2. A direct current load breaking switching mechanism, comprising:

a contact point constitution set forth in claim 1.

3. A relay, comprising:

a contact point constitution set forth in claim 1.

4. A switch, comprising:

a contact point constitution set forth in claim 1.

* * * * *